United States Patent [19]

Okanoue

[11] Patent Number: 5,689,640
[45] Date of Patent: Nov. 18, 1997

[54] METHOD AND SYSTEM FOR DOWNLOADING DATA TO NETWORK NODES

[75] Inventor: Yasuyo Okanoue, Tokyo, Japan

[73] Assignee: NEC Corporation, Tokyo, Japan

[21] Appl. No.: 490,551

[22] Filed: Jun. 15, 1995

[30] Foreign Application Priority Data

Jun. 15, 1994 [JP] Japan .................... 6-156808

[51] Int. Cl.$^6$ ................ G06F 13/38; G06F 12/02
[52] U.S. Cl. ............. 395/200.01; 395/309; 395/800; 395/200.09; 364/DIG. 1; 364/DIG. 2
[58] Field of Search ............ 395/200.01, 200.15, 395/200.16, 800, 309, 489, 182.04, 185.01, 250, 200.17, 200.08, 200.19, 200.09, 311, 136; 370/450, 455, 468, 471, 427; 345/173; 364/DIG. 1, DIG. 2

[56] References Cited

U.S. PATENT DOCUMENTS

| 4,045,781 | 8/1977 | Levy et al. ............. 395/489 |
| 4,236,210 | 11/1980 | Terakawa et al. ........ 395/309 |
| 4,993,025 | 2/1991 | Vesel et al. ............ 370/450 |
| 5,241,541 | 8/1993 | Farrell et al. .......... 370/438 |
| 5,283,862 | 2/1994 | Lund .................... 345/173 |
| 5,541,914 | 7/1996 | Krishnamoorthy et al. .. 370/427 |

OTHER PUBLICATIONS

IBM Technical Disclosure Bulletin, vol. 35:48; Sep. 1992; New York; pp. 216-217; "High Availability Communication Adapter".

Primary Examiner—Daniel H. Pan
Attorney, Agent, or Firm—Sughrue, Mion, Zinn, Macpeak & Seas, PLLC

[57] ABSTRACT

A network system comprises a terminal storing a update data file, a gateway device having a temporary memory, and a network comprising a plurality of nodes. Each node is provided with an active memory for storing a current data file and at least a backup memory for storing the update data file. Data of the update data file are sequentially transferred from the terminal to the backup memory of each node through the gateway device in which the date are stored into the temporary memory. After the update data file has been stored in the backup memory, the update data file is caused to be active and the current data file to be non-active.

30 Claims, 8 Drawing Sheets

METHOD AND SYSTEM FOR DOWNLOADING DATA TO NETWORK NODES

BACKGROUND OF THE INVENTION

1. Field of the Invention

The present invention relates to a technique of updating data of a plurality of network nodes and, more specifically, to a method for downloading the same data to respective memories of the network nodes and a system therefor.

2. Description of the Related Art

In general, a memory chip incorporating firmware is mounted on a computer or the like to increase the speed of executing a program. While firmware usually has such a semi-fixed software function as an operating system has, processing for altering firmware may be needed when the situation is changed. Conventionally, such alteration is effected by replacing a memory chip incorporating firmware with another one.

However, in a communications network having a plurality of network nodes (hereinafter called "CPU units") as components, it takes much time and labor for a maintenance person to pull out a package and replace a memory chip with another one. Further, the network service is interrupted during such an operation.

To solve the above problem, in recent years, there has been proposed and put into a practical stage a download method in which firmware updating is effected by transferring new firmware to memories of respective CPU units from the outside of a network.

However, in the conventional download method, since data is transferred from an external terminal to a plurality of CPU units according to a point-to-point scheme, the firmware updating cannot be performed at high speed, which means that the network service interrupting time cannot be shortened sufficiently. In particular, the interrupting time becomes longer as the number of CPU units (network nodes) increases.

Further, in the conventional system, since the new firmware is rewritten to the memory of a CPU unit upon downloading, the old firmware cannot be used immediately when the new firmware has a problem, in which case the network service interrupting time is further elongated.

SUMMARY OF THE INVENTION

An object of the present invention is to provide a download method and a network system which can shorten the network service interrupting time by efficiently transferring the same data to a plurality of network nodes.

Another object of the invention is to provide a network system in which old data can easily be used even after new data has been downloaded.

A system according to the present invention is comprised of a terminal storing a update data file, a transfer device having a temporary memory, and a network comprising a plurality of nodes. Each node is provided with a plurality of memories each for storing the update data file or a current data file. Preferably, each of the memories comprise an active memory for storing the current data file and at least one backup memory for storing the update data file. The update data file is transferred from the terminal to the respective backup memories of the nodes through the transfer device where the update data file is also stored onto the temporary memory. After the update data file has been stored in the backup memory, the update data file is caused to be active and the current data file is caused to be non-active. If the update data file does not perform properly, the current data file is caused to be active and the update data file is caused to be non-active.

Preferably, the current data file is stored in the first backup memory as well as the active memory and the update data file is stored in a second backup memory. After the update data file has been stored in the second backup memory, the update data file stored in the second backup memory is copied onto the active memory. If the update data file does not perform properly, the current data file stored in the first backup memory may be copied onto the active memory.

The data of the update data file are sequentially transferred from the terminal to the transfer device. The data of the update data file are further sequentially transferred from the transfer device to all the nodes of the network while being stored in the temporary memory of the transfer device.

In downloading the same data file to a plurality of network nodes, data are sequentially transferred to the network nodes while being stored in a connection device between the terminal and the network. When the network nodes are connected in tandem, the data are transferred in a relayed manner over the network nodes, and stored into the respective nodes. When the network nodes are connected to each other via a bus, the data are transferred from the connection device to the respective nodes in a parallel manner. Therefore, even if some trouble occurs between any two nodes, since the data of the update data file is stored in the connection device or the previous node, downloading can be easily restarted. Furthermore, since each network node is provided with memories for storing an updating data file and a current data file, even after the update data file has been downloaded, the current data file can easily be executed.

BRIEF DESCRIPTION OF THE DRAWINGS

FIG. 2 (A) is a flowchart showing a general operation of a gateway device of the embodiment of FIG. 1;

FIG. 2 (B) is a flowchart showing a general operation of each CPU unit;

DESCRIPTION OF THE PREFERRED EMBODIMENTS

Figure 1:
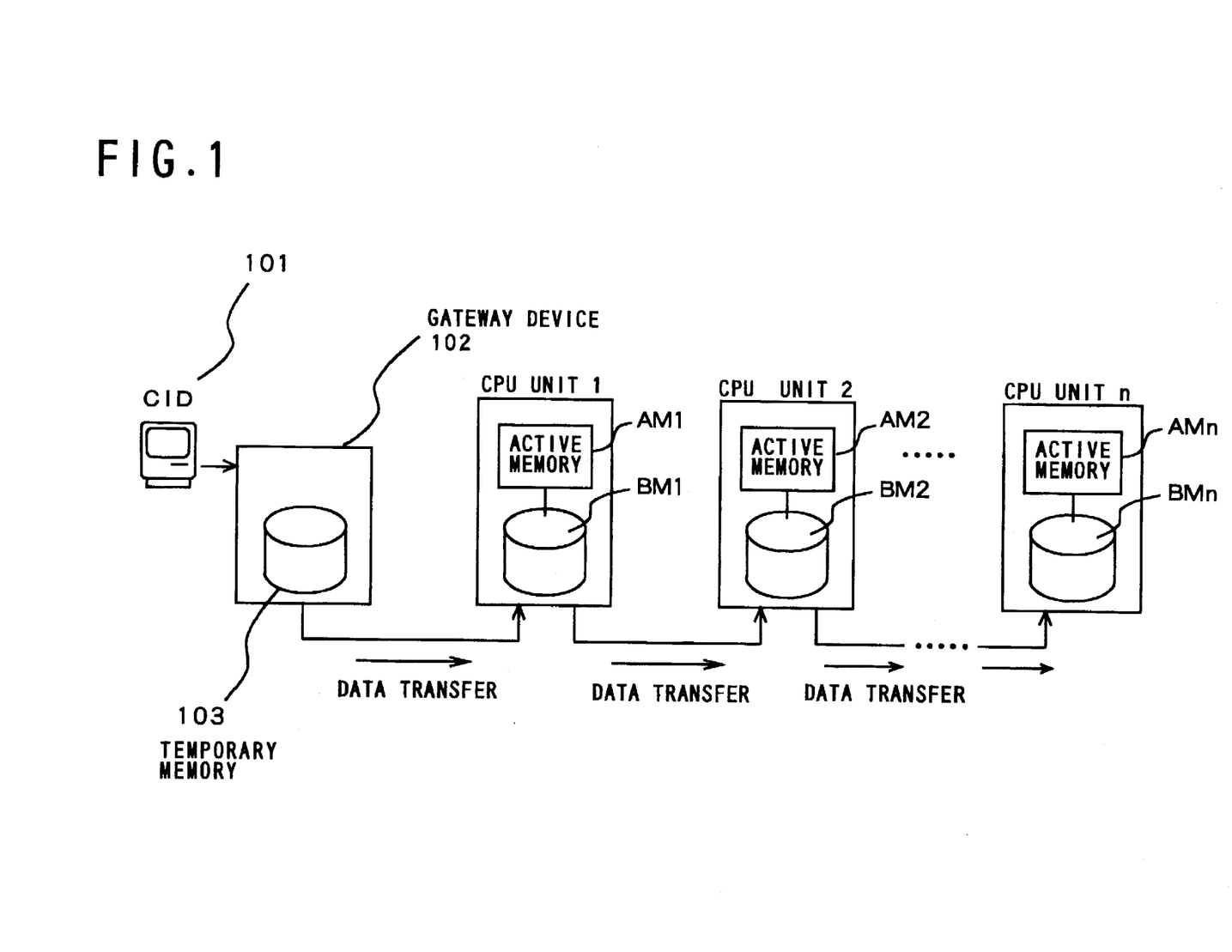
FIG. 1 is a schematic block diagram showing a tandem network according to an embodiment of the present invention.

Referring to FIG. 1, a network system is comprised of a terminal 101, a gateway device 102, and a plurality of tandem-connected network nodes 1-n. Hereinafter, the terminal 101 is referred to as CID (craft interface device), and the network nodes 1-n are referred to as CPU units. The CPU unit 1 is connected to the CID 101 via the gateway device 102 which is connected to the CID 101 directly by use of a communication device or via another network. New firmware to be transferred is stored as a download file in the CID 101.

The gateway device 102, which is used for connection of a network, connects the CID 101 with the CPU unit 1 in this embodiment. Where the CID 101 is distant from the CPU unit 1 and connected to another network, the gateway device 102 connects that network to the CPU unit 1. The gateway device 102 is provided with at least a processor (CPU) and a temporary memory 103 having a capacity larger than the size of the download file stored in the CID 101.

The CPU units 1-n, which are connected in tandem with the gateway device 102 as a starting point device, are target units of the firmware downloading. The respective CPU units 1-n are provided with processors (CPUs), active memories AM1–AMn, and backup memories BM1–BMn. The active memories AM1–AMn and backup memories BM1–BMn have a capacity larger than the size of the download file. A specific configuration of each CPU unit will be described later with reference to FIG. 5 or 7.

Figure 2A:
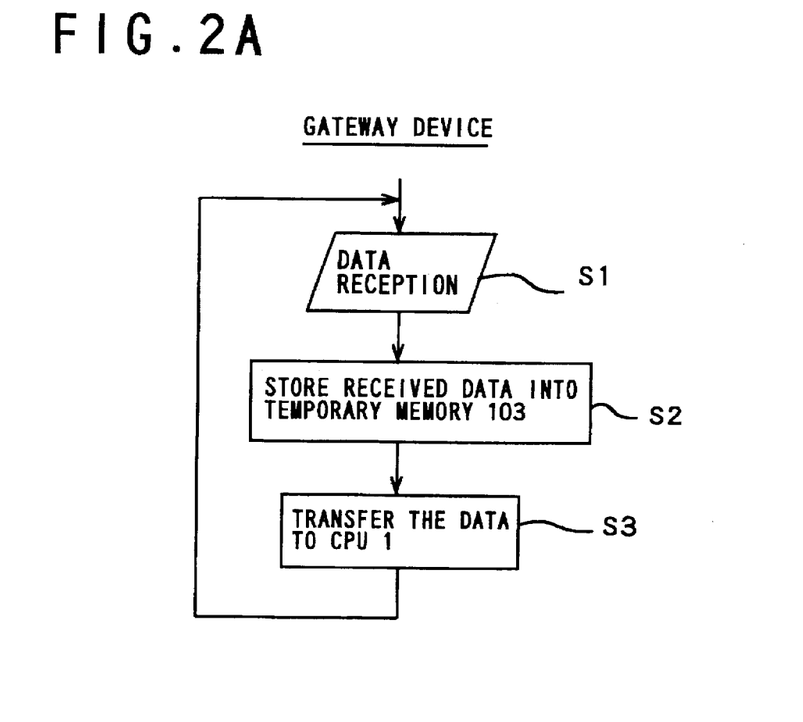
Figure 2B:
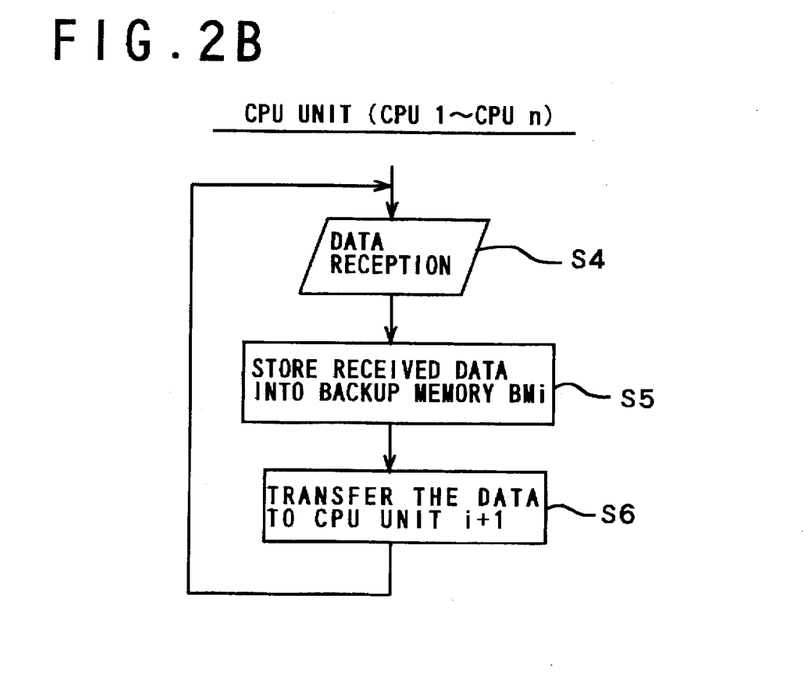

In FIGS. 2(A) and 2(B), respective operations of the gateway device 102 and each CPU unit are illustrated. Referring to FIG. 2(A), the CID 101 transmits a control message and a download file (new firmware) to the gateway device 102. The control message includes information of the total data amount of the download file. Upon reception of the first data (step S1), the gateway device 102 stores that data into the temporary memory 103 (step S2), and transfers the same data and the control message to the CPU unit 1 (step S3). In the similar manner, steps S1–S3 are repeated until all the data of the download file are correctly transferred to CPU unit 1.

Referring to FIG. 2(B), upon reception of the control message and the first data from the gateway device 102 (step S4), the CPU unit 1 stores that data into the backup memory BM1 (step S5), and transfers the control message and the same data to the next target unit, i.e., the CPU unit 2 (step S6). By recognizing the total data amount of the download file from the control message, the CPU unit 1 repeats the operations of storing data received from the gateway device 102 into the backup memory BM1 and transferring the same data until transferring all the data correctly to the CPU unit 2. Performing the similar operations, the CPU unit 2 transfers all the data of the download file to the CPU unit 3. The remaining CPU units perform the similar operations repeatedly and, as a result, the new firmware file is stored into the backup memory BMi of each CPU unit.

When the new firmware has been stored into every CPU unit, the backup memory BMi and the active memory AMi are switched in each CPU unit in response to a user's instruction or by automatic control as described later, and an operation based on the new firmware is started with securing the old firmware.

According to the configuration of this embodiment, even if transfer between the gateway device 102 and the CPU unit 1 fails, correct data are secured in the temporary memory 103 of the gateway device 102. And even if transfer fails at any other location, the correct data are stored in the backup memory BM of the immediately preceding CPU unit. Therefore, the data transfer may be restarted from the location of failure.

Figure 3:
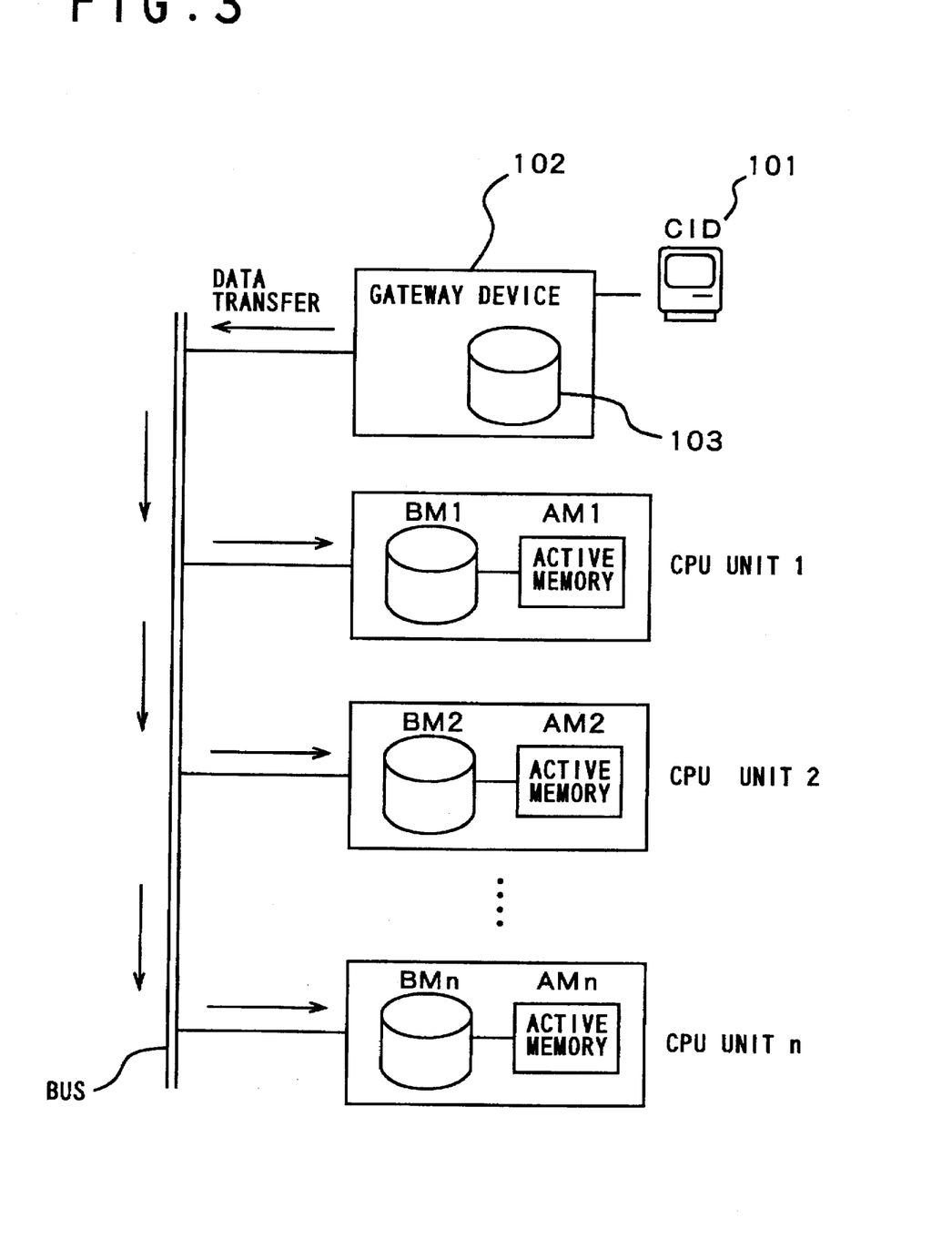
FIG. 3 is a schematic block diagram showing a bus network system according to another embodiment of the invention.

Referring to FIG. 3, CPU units 1-n and a gateway device 102 are connected to each other via a bus. A download file transmitted from the CID 101 is transferred to the CPU units 1-n in a parallel manner via the bus while being stored into a temporary memory 103 of the gateway device 102.

Figure 4A:
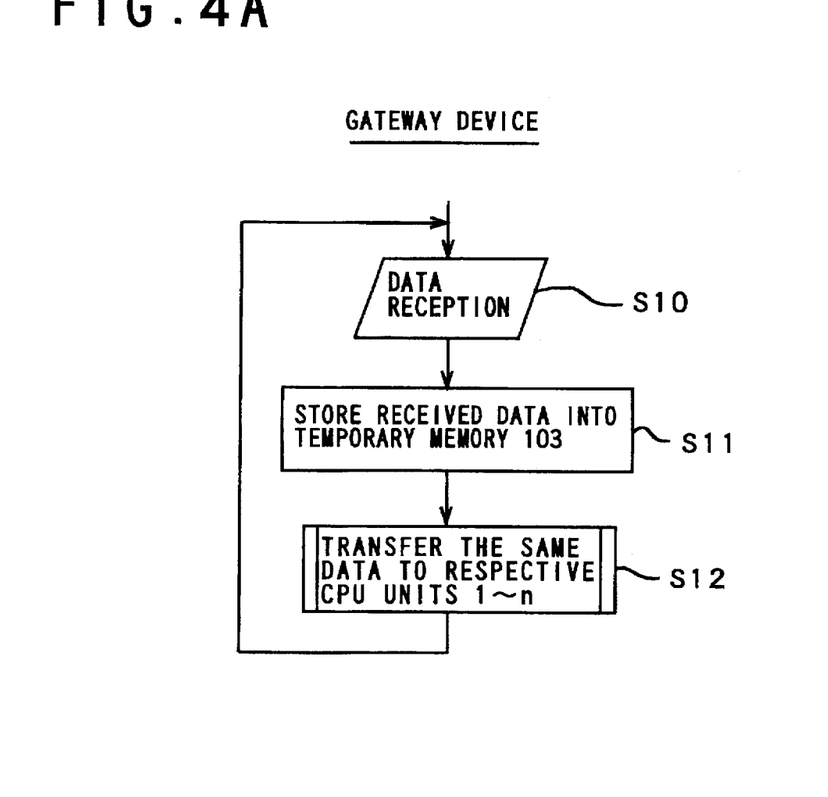
FIG. 4(A) is a flowchart showing a general operation of a gateway device of the system of FIG. 3.

Referring to FIG. 4(A), the CID 101 transmits a download file (new firmware) to the gateway device 102. Upon reception of the first data (step S10), the gateway device 102 stores that data into the temporary memory 103 (step S11), and transfers the same data to respective CPU units 1-n (step S12). The gateway device 102 independently controls data transfer operations to the respective CPU units 1-n, and repeats steps S10–S12 until all the data of the download file have been correctly transferred to CPU units 1-n.

Figure 4B:
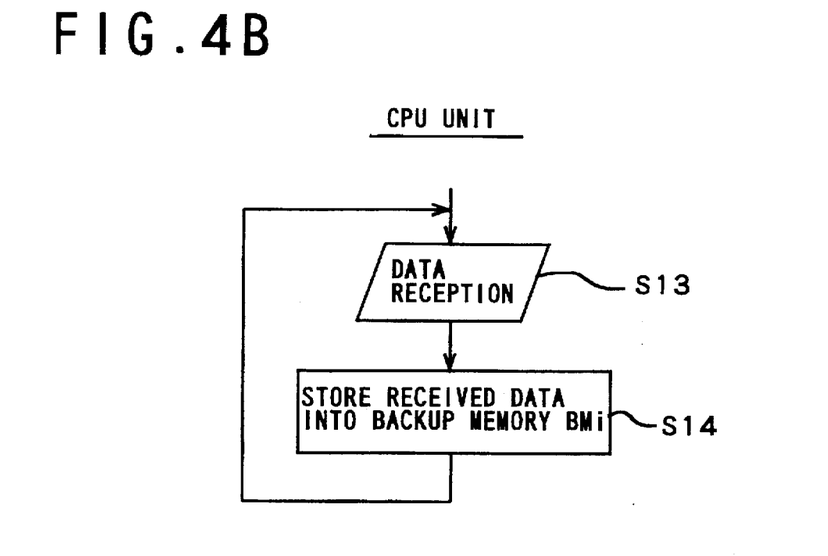
FIG. 4(B) is a flow chart showing a general operation of each CPU unit.

Referring to FIG. 4(B), upon reception of the first data from the gateway device 102 (step S13), each CPU unit stores that data into the backup memory BMi (step S14). By repetition of the similar operations, all the new firmware is stored into the backup memory BMi of each CPU unit.

When the new firmware is stored into every CPU unit, the backup memory BMi and the active memory AMi are switched in each CPU unit in response to a user's instruction or by automatic control, and an operation based on the new firmware is started.

According to the configuration of this embodiment, even if transfer between the gateway device 102 and each CPU unit fails, the data transfer may be restarted (i.e., the data are transmitted from the temporary memory 103 of the gateway device 102) because the correct data are secured in the temporary memory 103.

First Example of Network Node

Figure 5:
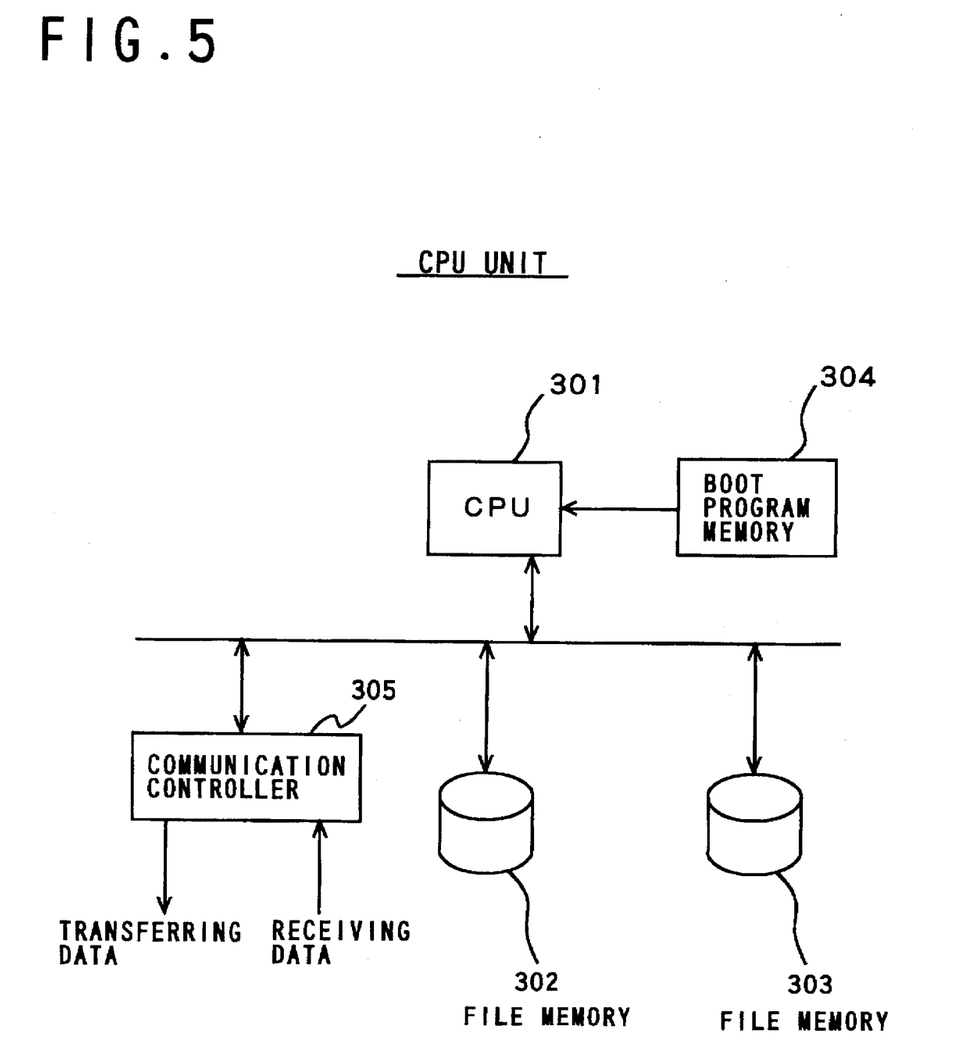
FIG. 5 is a schematic block diagram showing a configuration of a CPU unit of a network system according to the invention.

FIG. 5 illustrates a configuration of a CPU unit in an embodiment of a network system according to the invention. A plurality of CPU units may be connected to each other as shown in FIG. 1 or 3.

The CPU unit is comprised of a processor (CPU) 301, file memories 302 and 303, a boot program memory 304, and a communication controller 305. Each of the file memories 302 and 303 is comprised of a nonvolatile memory for storing a data file such as a download data file (new firmware) in active state or non-active state. The CPU 301 controls the file memories 302 and 303 such that one file memory is placed in active state and the other in non-active state. Further, the CPU 301 controls the communication controller 305 such that the download data file is received/transferred from/to outside. In connection with the embodiment of FIG. 1, a file memory for storing a download data file corresponds to the backup memory BMi and the other file memory to the active memory AMi. The boot program memory 304 is also a nonvolatile memory. A boot program stored therein serves for booting the CPU unit with selecting one of the file memories 302 and 303 at the time of a start-up or resetting. Data transfer as described above is performed under control of the communication controller 305.

Figure 6:
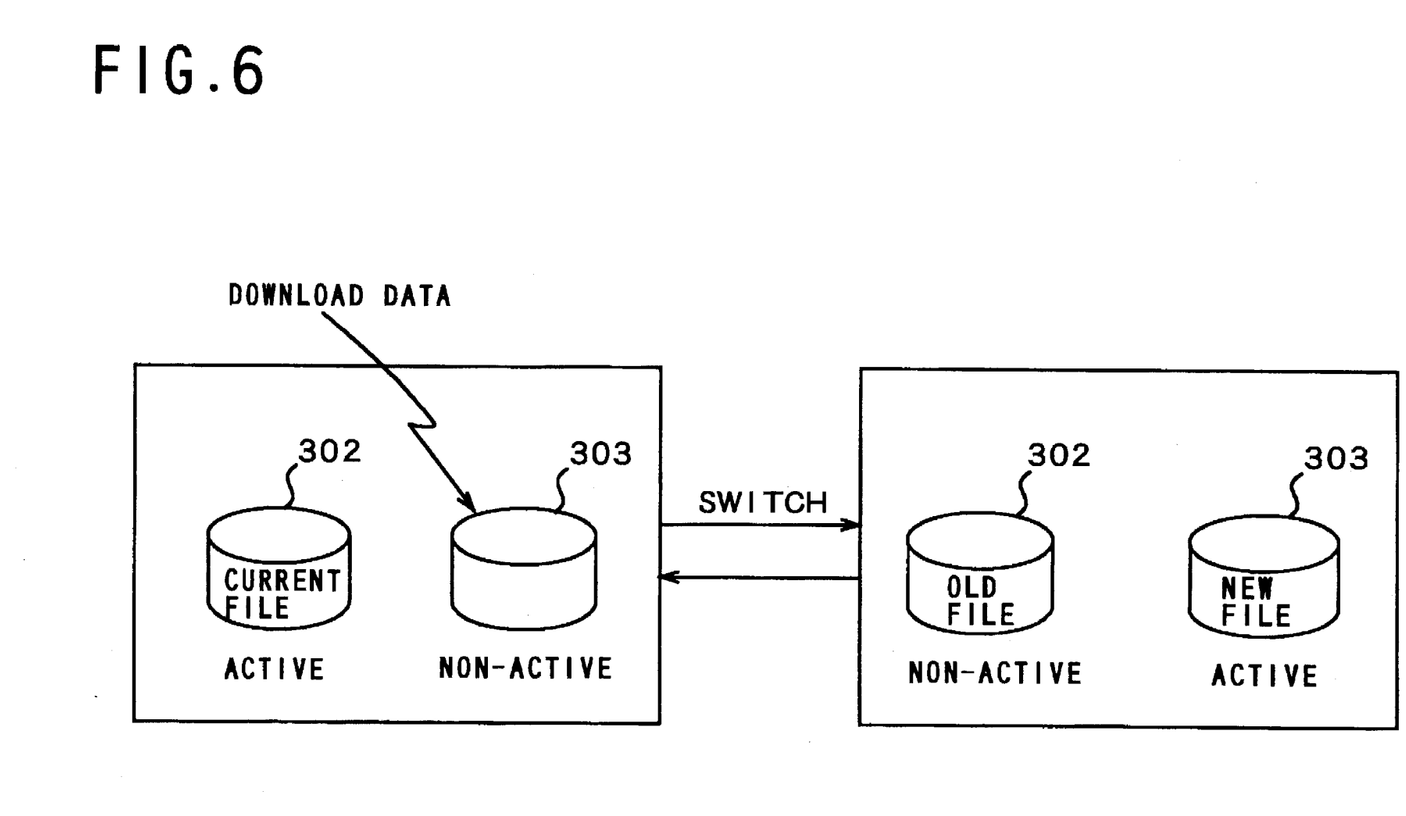
FIG. 6 is a memory state transition diagram of the CPU unit of FIG. 5.

FIG. 6 shows a memory state transition diagram of the CPU unit shown in FIG. 5. Assuming that the memory 302 stores a current file and is in an operating state and the memory 303 is in a non-operating state, download data received from, for example, the adjacent CPU unit, is stored into the memory 303 which is now in non-operation, resulting in no influence on the memory 302 which is now in operation.

Upon execution of a "switch" command after completion of downloading, operation states of the memory 302 and the memory 303 are changed so that the memory 303 now storing a new file is placed in operation and the memory 302 now storing an old file is rendered into non-operation. In this way, the file updating is completed. Since the memory 302 now in a non-operating state stores an old file, even if some problem occurs in the new file, the old file can be activated easily, avoiding an event that the network service is interrupted for a long time.

Second Example of Network Node

Figure 7:
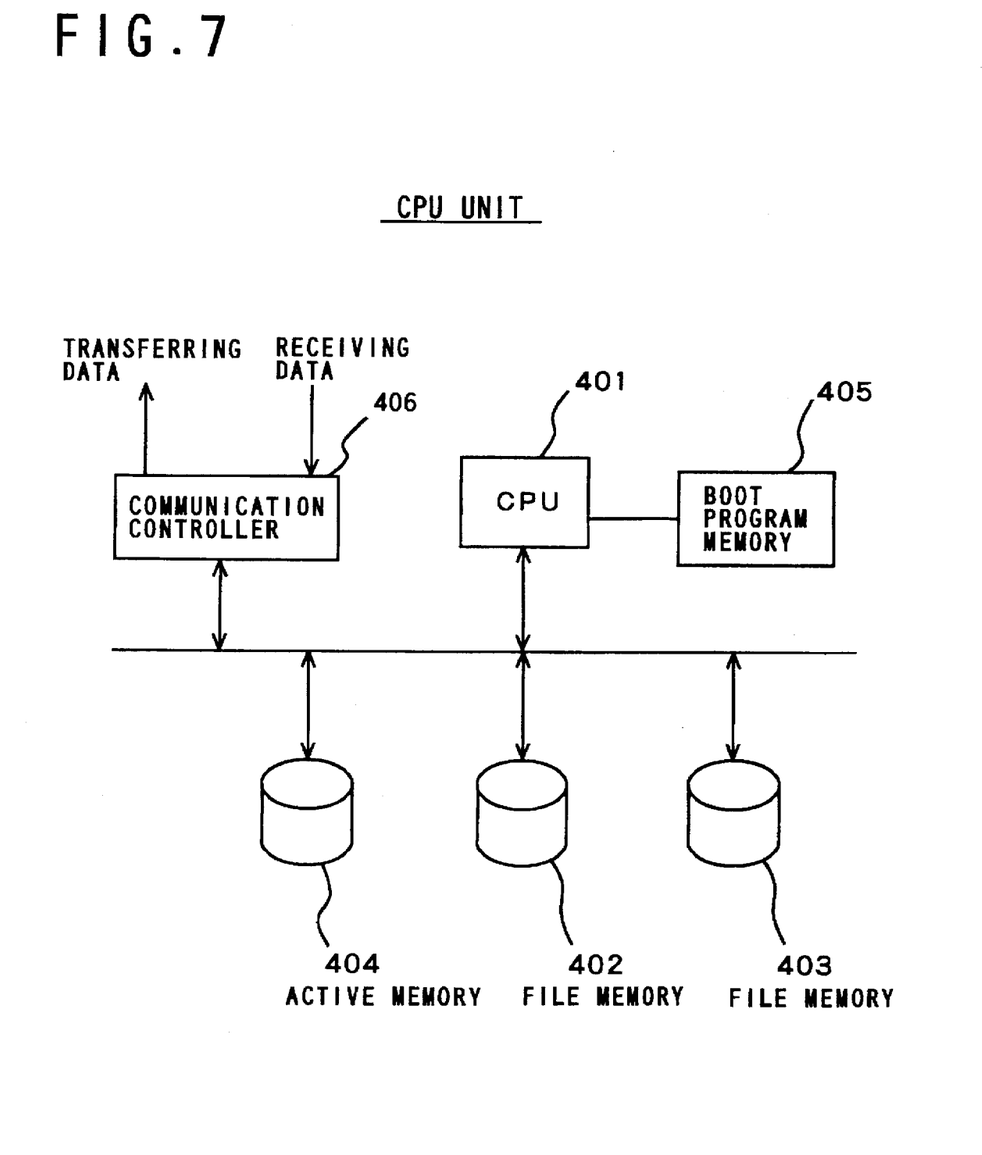
FIG. 7 is a schematic block diagram showing another configuration of a CPU unit of a network system according to the invention.

FIG. 7 shows a configuration of a CPU unit in another embodiment of a network system according to the invention. The CPU unit is comprised of a CPU 401, file memories 402 and 403, an active memory 404, a boot program memory 405, and a communication controller 406. Each of the file memories 402 and 403 is a nonvolatile firmware storing memory for storing a received download file (new data file), and retaining an old data file in a non-execution state. More specifically, the CPU 401 controls the file memories 402 and 403 such that one file memory stores the new data file and the other stores the old data file. Further, the CPU 401 controls the communication controller 406 such that the download data file is received/transferred from/to outside. The active memory 404 stores an active data file in use. The boot program memory 405 is also a nonvolatile memory. A boot program stored therein serves for booting the CPU unit with selecting one of the file memories 402–404 at the time of a start-up or resetting. Data transfer as described above is performed under control of the communication controller 406.

The data file as stored in the active memory 404 is always stored in one of the file memories 402 and 403, and download data is written to the other file memory. In such operations, one file memory does not cause any influence on the other file memory.

When downloading has been finished with all the download data stored into one file memory, the download data are copied to the active memory 404 and the CPU unit operates under the new firmware. However, since the old file is stored in the other file memory, the old-version firmware can be restored easily by copying the old file data to the active memory 404.

Figure 8:
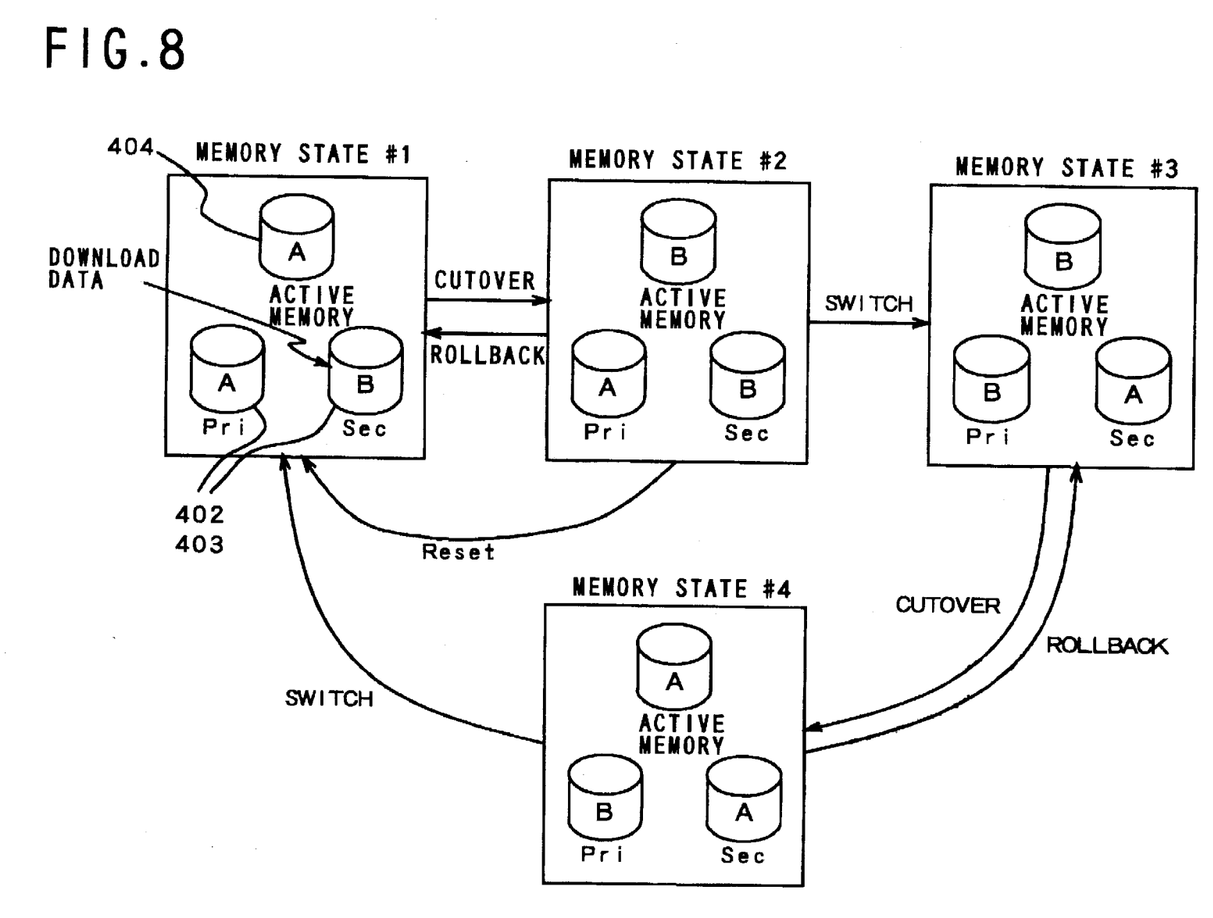
FIG. 8 is a memory state transition diagram of the CPU unit of FIG. 7.

FIG. 8 illustrates a memory state transition diagram of the CPU unit shown in FIG. 7. In this diagram, the file memories 402 and 403 are logically discriminated as a primary memory (Pri) and a secondary memory (Sec). Upon every execution of a "reset" operation, the contents of the primary memory are copied to the active memory 404. An active file is always stored in the active memory 404.

Referring to FIG. 8, in memory state #1, an active file A is stored in the active memory 404, the same file A is stored in the primary file as a current file, and a download file B is stored in the secondary memory.

When a "cutover" operation is executed in this state #1, the download data B of the secondary memory is copied to the active memory 404 and is activated. Thus, the memory state changes from the state #1 to the state #2. When a "rollback" operation is executed in the memory state #2, the data A of the primary memory is copied to the active memory 404 and is activated. Thus, the memory state returns from #2 to #1.

When a "switch" operation is executed in the memory state #2, processing for interchanging the primary memory and the secondary memory is performed. Thus, the memory state changes from #2 to #3.

When a "reset" operation is executed in the memory state #2, the data A of the primary memory is copied to the active memory 404 and the memory state returns to #1. However, even if the "reset" operation is executed in the memory state #3, no memory state transition is effected because the same data B is stored in the primary memory and the active memory.

Similarly, when the "cutover" operation is executed in the memory state #3, the memory state is changed from #3 to #4. When the "rollback" operation is executed in the memory state #4, the memory state returns to #3. When the "switch" operation is executed in the memory state #4, the memory state returns to #1.

For example, consider a case where downloading has been finished and the memory state is changed to #2 when the new file B is copied to the active memory 404 and is activated by the "cutover" operation. Even if some problem occurs in this state, the memory state #1 can be restored simply by executing the "reset" operation, causing the CPU unit to use the trusty old file A.

As described above in detail, according to the download method of the invention, a certain data file is efficiently downloaded to a plurality of network nodes by sequentially transferring the data file to the network nodes while storing it in each node. This results in reduced interrupt time of the network service, for example, even in updating firmware of all the network nodes.

Since any node of a network system according to the invention is provided with memories for respectively storing a deactivated data file and an activated or currently-used data file, an old data file can easily be executed even after downloading of the updating data file. Therefore, even if some problem occurs in the new data file, the old data file can easily be executed to thereby shorten the network service interrupting time.

What is claimed is:

1. A system comprising:
    a first device comprising a first memory for storing a first data file;
    a second device comprising a second memory for storing the first data file received from the first device; and
    a network which is connected to the second device and receives the first data file from the second device,
    the network comprising a plurality of nodes in a predetermined configuration,
    each the node comprising:
        a plurality of memories each having a capacity which is not smaller than an amount of the first data file, one of the plurality of memories storing a second data file; and
        control means for controlling the plurality of memories such that another of the plurality of memories stores the first data file received from the second device.

2. The system according to claim 1, wherein the control means controls the plurality of memories such a memory storing the first data file is caused to be active and a memory storing the second data file is caused to be non-active.

3. The system according to claim 2, wherein, when the first data file does not perform properly, the control means controls the plurality of memories such that the memory storing the first data file is caused to be non-active and the memory storing the second data file is caused to be active.

4. The system according to claim 1, wherein each node further comprises:
    an active memory for storing the second data file;
    a plurality of backup memories having at least a first and a second backup memory, the first backup memory storing the second data file; and control means for controlling the active memory and the plurality of backup memories such that the first data file received from the second device is stored onto the second backup memory and the first data file stored in the second backup memory is copied on the active memory.

5. The system according to claim 4, wherein, when the first data file does not perform properly, the control means controls the active memory and the backup plurality of memories such that the second data file stored in the first backup memory is copied onto the active memory.

6. The system according to claim 1, wherein the second device further comprises first transfer means for sequentially transferring data from the first data file to the network while storing data of the first data file onto the second memory.

7. The system according to claim 6, wherein:
the network is a tandem network; and
each node further comprising second transfer means for sequentially transferring the data of the first data file received from the second device to a following node.

8. The system according to claim 6, wherein the network is a bus network.

9. In a system comprising a transfer device and a network connected to the transfer device, the network comprising a plurality of nodes each comprising a plurality of memories, one of the plurality of memories storing a first data file, a data transfer method for transferring a second data file to each node, comprising the steps of:
sequentially transferring data of the second data file to the transfer device;
sequentially transferring the data of the second data file from the transfer device to the network, while storing the data of the second data file in the transfer device;
storing the data of the second data file received from the transfer device onto another memory of each node.

10. The method according to claim 9, further comprising the step of causing the memory storing the second data file to be active and the memory storing the first data file to be non-active.

11. The method according to claim 10, further comprising the step of causing the memory storing the second data file to be non-active and the memory storing the first data file to be active, when the second data file does not perform properly.

12. The method according to claim 9, wherein each node comprises:
an active memory for storing the first data file; and
a plurality of backup memories having at least a first and a second backup memory, the first backup memory storing the first data file.

13. The method according to claim 12, further comprising the step of controlling the active memory and the plurality of backup memories such that the second data file received from the transfer device is stored onto a second backup memory and the second data file stored in the second backup memory is copied onto the active memory.

14. The method according to claim 9, wherein the network is a tandem network.

15. The method according to claim 14, further comprising the step of sequentially transferring the data of the second data file received from the transfer device to a following node.

16. The method according to claim 14, wherein the network is a bus network.

17. A data updating system comprising:
a first device comprising a first memory for storing a first data file;
a second device comprising a second memory for storing the first data file received from the first device; and
a network which is connected to the second device and receives the first data file from the second device,
the network comprising a plurality of nodes in a predetermined configuration,
each node comprising:
a plurality of memories each having a capacity which is not smaller than an amount of the first data file, one of the plurality of memories storing a current data file; and
control means for controlling the plurality of memories such that another of the memories stores the first data file received from the second device to use the first data file as an active data file.

18. The data updating system according to claim 17, wherein the control means controls the plurality of memories such that the memory storing the data file is caused to be active and the memory storing the current data file is caused to be non-active.

19. The data updating system according to claim 17, wherein each node comprises:
an active memory for storing a current data file;
a plurality of backup memories, a first backup memory storing the current data file; and
control means for controlling the active memory and the plurality of backup memories such that the data file received from the second device is stored onto a second backup memory and the data file stored in the second backup memory is copied onto the active memory.

20. The data updating system according to claim 17, wherein the second device further comprises first transfer means for sequentially transferring data of the data file to the network while storing the data onto the second memory.

21. The data updating system according to claim 20, wherein:
the network is a tandem network; and
each node further comprising second transfer means for sequentially transferring the data of the data file received from the second device to a following node.

22. The data updating system according to claim 20, wherein the network is a bus network.

23. In a system comprising a transfer device and a network connected to the transfer device, the network comprising a plurality of nodes each comprising a plurality of memories, one of the plurality of memories storing a first firmware file, a firmware download method for downloading a second firmware file to each the node, comprising the steps of:
sequentially transferring data of the second firmware file to the transfer device;
sequentially transferring the data of the second firmware file from the transfer device to the network, while storing the data of the second firmware file in the transfer device;
storing the data of the second firmware file received from the transfer device onto another memory of each node.

24. The firmware download method according to claim 23, further comprising the step of causing the memory storing the second firmware file to be active and the memory storing the first firmware file to be non-active.

25. The firmware download method according to claim 23, further comprising the step of causing the memory storing the second firmware file to be non-active and the memory storing the first firmware file to be active, when the second firmware file does not perform properly.

26. The firmware download method according to claim 23, wherein each node comprises:
an active memory for storing the first firmware file; and
a plurality of backup memories, a first backup memory storing the first firmware file.

27. The firmware download method according to claim 26, further comprising the step of controlling the active memory and the backup memories such that the second firmware file received from the transfer device is stored onto a second backup memory and the second firmware file stored in the second backup memory is copied onto the active memory.

28. The firmware download method according to claim 23, wherein the network is a tandem network.

29. The firmware download method according to claim 28, further comprising the step of sequentially transferring the data of the second firmware file received from the transfer device to a following node.

30. The firmware download method according to claim 23, wherein the network is a bus network.

* * * * *